United States Patent

[11] 3,563,576

| [72] | Inventor | Thomas E. Lee<br>1019 Upper Happy Valley Road, Lafayette, Calif. 94549 |
| --- | --- | --- |
| [21] | Appl. No. | 817,706 |
| [22] | Filed | Apr. 21, 1969 |
| [45] | Patented | Feb. 16, 1971 |

[54] TUBULAR JOINT CONSTRUCTION
5 Claims, 5 Drawing Figs.

[52] U.S. Cl.................................................. 285/353; 285/369
[51] Int. Cl.................................................. F16l 17/00
[50] Field of Search........................................... 285/(glass), 353, 384, 369, 325, 387

[56] References Cited
UNITED STATES PATENTS
1,063,996  6/1913  Moore.......................... 285/369

FOREIGN PATENTS

| 1,161,791 | 3/1958 | France .......................... | 285/353 |
| --- | --- | --- | --- |
| 815,671 | 7/1959 | Great Britain................ | 285/369 |
| 834,853 | 5/1960 | Great Britain................ | 285/glass |
| 1,009,219 | 11/1965 | Great Britain................ | 285/369 |
| 309,288 | 11/1955 | Switzerland.................. | 285/glass |

*Primary Examiner*—Dave W. Arola
*Attorney*—Eckhoff and Hoppe

ABSTRACT: A joint construction for joining juxtaposed tubular ends of glass tubing, laboratory glassware, and the like which comprises a peripheral flange formed on each of the tube ends to be joined, a sealing sleeve in sealing engagement with the outside surfaces of the tube ends and disposed between the inside faces of the flanges, and male and female slotted and threaded coupling elements which thread together over the sleeve and seat upon the exterior faces of the flanges.

PATENTED FEB 16 1971          3,563,576
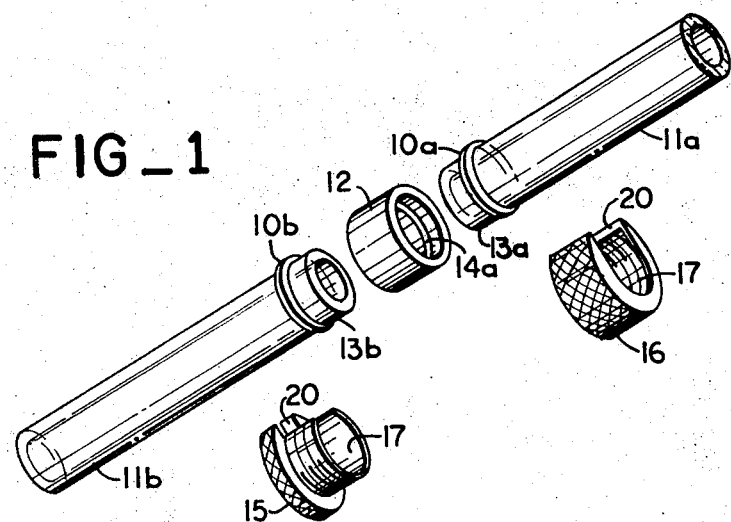
FIG_1
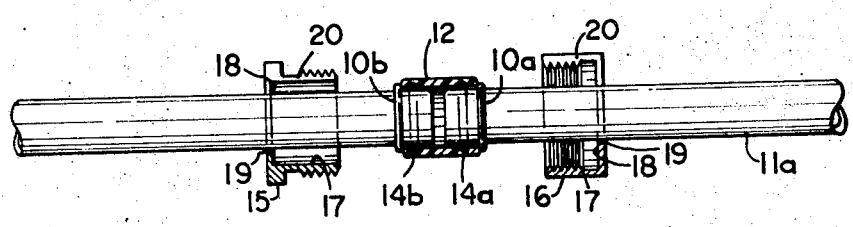
FIG_2
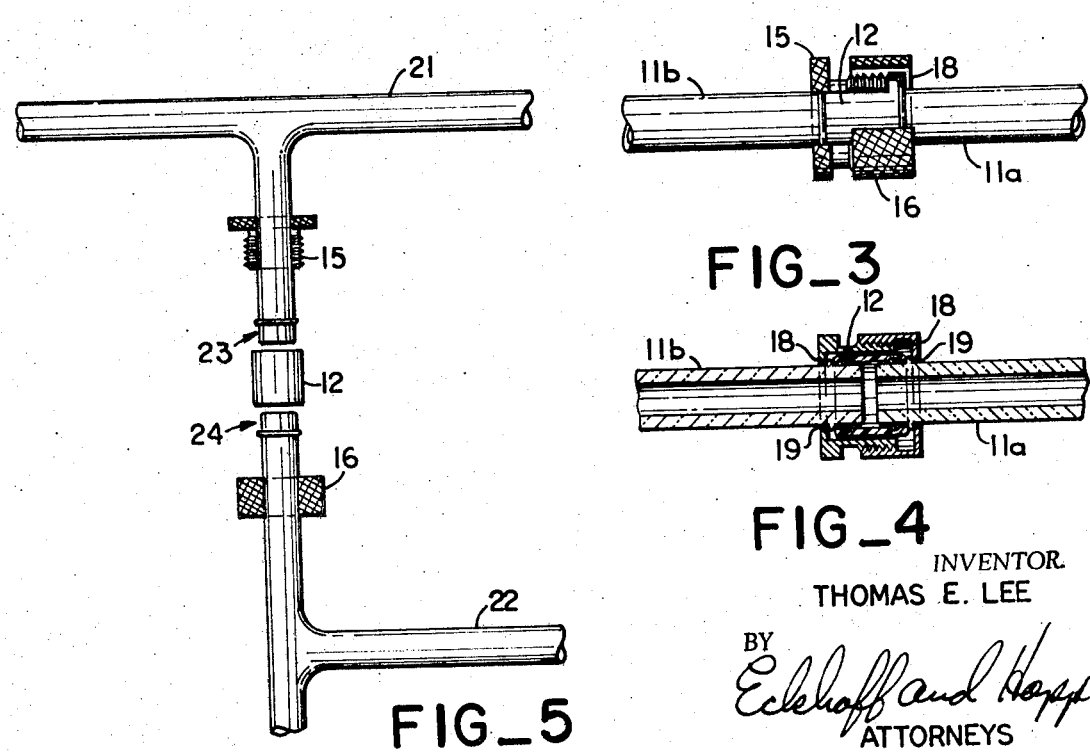
FIG_3
FIG_4
FIG_5
INVENTOR.
THOMAS E. LEE
BY
Eckhoff and Hoppe
ATTORNEYS

TUBULAR JOINT CONSTRUCTION

This invention relates generally to joint constructions for glass tubing, glass piping and laboratory glassware and more particularly to a joint construction for joining two juxtaposed glass tube ends which seals against leakage from external or internal pressure with enough flexibility to permit movement or misalignment without breakage of the brittle glass material. The invention is a joint structure utilizing in combination a semirigid sleeve to join resiliently and seal together the ends of a pair of glass tubes, for example, and threaded coupling elements to maintain the sleeve mechanically in its joining and sealing functions with the tube ends.

One object of this invention is to provide a quickly connected or disconnected joint which tolerates misalignment;

Another object of the invention is to provide a flexible joint construction which develops a tight pressure or vacuum seal with the exterior surfaces of the juxtaposed tube ends;

An object of the invention is to provide a joint construction which maintains substantially continuous glass continuity at the joint to prevent fluids passing through the joint from corroding or eroding or becoming contaminated by seal material;

Still another object of the invention is to provide coupling means which mechanically lock the connected joint and which may be applied to the joint after the juxtaposed tube ends have been joined.

Heretofore, glass tubing, pipe and glassware joints of the type disclosed in U.S. Pat. No. 3,372,949 issued on Mar. 12, 1968 to McLay, et al. have been in commercial use in conjunction with pinch-type clamps of the design shown in U.S. Pat. No. 2,397,438.

The joint of the present invention enjoys improved vacuum sealing qualities, requires less material in the tube ends and has a longer useful life than that of such prior art joints since the vacuum or pressure seal is against the outside surfaces of the pipe ends which are not subjected to corrosion or erosion by fluids carried within the pipe.

Other objects and advantages of this invention will become apparent from a consideration of the following description in connection with the drawing wherein:

FIG. 1 is an exploded perspective view of the joint construction of this invention showing all of its elements;

FIG. 2 is an elevational view of the joint, partly in section, prior to assembly of the coupling elements;

FIG. 3 is an elevational view of the joint with the coupling elements shown assembled to secure the joint;

FIG. 4 is a sectional view of the fully assembled joint taken on the center line; and FIG. 5 is an exploded plan view illustrating how the joint can easily be applied to complex tubing structures or large diameter glassware.

The joint includes integrally formed flanges 10a, 10b near the extremity of each end of the juxtaposed pieces of tube, pipe, glassware of other apparatus designated 11a, 11b, respectively. The joint is useful for glass, quartz, ceramic and tubing, pipe or glassware formed from other brittle materials.

A semirigid or slightly resilient sealing sleeve 12 overlies the extremity of each of the tube ends between the interior faces of flanges 10a, 10b. Fluoroelastomers such as Teflon are useful sleeve materials. The length of the sleeve is slightly in excess of twice that of the ends 13a, 13b of the juxtaposed tube ends and the sleeve has an inner diameter slightly smaller than the outside diameter of the tube ends to form an interference fit therebetween. The inner surface of sealing sleeve 12 carries near each of its ends elastomeric O-rings 14a, 14b, held within annular grooves formed on the inside surface of the sleeve.

The tube ends 13a, 13b may have a slight taper for easy insertion within the sealing sleeve 12. The combination of the flexibility of the sealing sleeve 12 and O-rings 14a, 14b, and of these tapers tolerates misalignment of the tube ends but still maintains an excellent pressure or vacuum seal.

The joint is easily assembled by inserting the tube ends 13a, 13b into opposite ends of sealing sleeve 12. A knurled male threaded coupling element 15 and a mating female threaded coupling element 16 secure the joint in this assembled condition. Both elements have a partial central bore 17 of diameter greater than the juxtaposed tube ends 11a, 11b, and the sealing sleeve 12. The partial central bores 17 of each terminate in a seat 18 which extends inwardly from the central bore walls and is pierced by a hole 19 having a diameter greater than that of the juxtaposed tube ends 11a, 11b but less than the outside diameter of the flanges 10a, 10b. The plain central bore of the male coupling element is slightly larger than outside diameter of the sealing sleeve. The central bore of the female coupling element is larger and is threaded to mate with the threaded male coupling element.

The coupling elements 15, 16 also each have a longitudinal assembly slot 20 with a width in excess of the outside diameter of the tube ends 11a, 11b. These slots enable assembly of the coupling elements by sleeving them over the glass tube or pipe after the sealing sleeve and tube ends have been connected.

After the sleeve and tube ends have been assembled the male coupling element may be fitted over the tube at one side of the joint and its central bore is sleeved over the sealing sleeve. Then the female coupling element 16 is fitted over the tube at the other side of the joint. They are then threaded together until seats 18 bear against the corresponding flanges 10a, 10b of the tube ends. The threaded coupling thus mechanically holds the joint together against substantial pressure within the glass piping system.

The joints are quickly disconnected by unthreading coupling elements 15, 16 and pulling apart the interference fit between tube ends 13a, 13b and the sealing sleeve 12 and its O-rings 14a, 14b.

FIG. 5 illustrates how irregular or large diameter glassware, in this instance a pair of T-shaped tubing assemblies 21 and 22, can be joined by insertion of their flanged ends 23, 24 into sealing sleeve 12 and then by later application of the slotted coupling elements 15, 16 can be secured. The coupling elements need not be inserted upon the tube ends prior to their insertion in the sealing sleeve but can be applied afterwards when, for example, the entire glass tubing arrangement has been assembled and preliminarily aligned.

The specific embodiment is described for illustrative purposes only. It will be apparent to those skilled in this art that modifications to the structure may be practiced and equivalents substituted for the specific elements described which are within the scope of the invention defined in the following claims.

I claim:

1. A joint construction for joining juxtaposed ends of two pieces of tube and the like, for forming a flexible and quickly joined and disconnected fluidtight joint therebetween comprising:

an integral rigid flange formed near each of the juxtaposed ends, each of said flanges having an outside diameter greater than the outside diameter of the adjoining tube;

a semirigid sealing sleeve having an inner surface defining a substantially uniform internal bore therethrough and fitting over both of said ends between said flanges; each of the juxtaposed ends having a portion between said flange and the tube end which has a diameter larger than the internal bore of said sleeve so as to provide an interference fit with said inner surface of said sleeve;

a male coupling element having a seat normally bearing against one of said flanges on its face opposite said sleeve; and a female coupling element having a seat normally bearing against the other of said flanges on its face opposite said sleeve, said coupling members being threaded together to hold said ends within said sealing sleeve.

2. The joint construction of claim 1 wherein said male coupling element has a central bore normally sleeved over said sealing sleeve.

3. The joint construction of claim 1, wherein the inner surface of said sealing sleeve carries at least one separate elastomeric O-ring for resiliently sealing said sealing sleeve and each of said ends with a resilient fluidtight seal.

4. The joint construction of claim 1 wherein the ends are tapered from the flanges to their extremities.

5. The joint construction of claim 1 wherein each of said male and female coupling elements has a longitudinal slot with a width in excess of the outside diameter of the juxtaposed tubes over which each fits.